United States Patent [19]
Liedtke et al.

[11] Patent Number: 5,683,745
[45] Date of Patent: Nov. 4, 1997

[54] PROCESS FOR THE PRODUCTION OF A MULTICOAT REFINISH

[75] Inventors: Hermann Liedtke, Hohenlockstedt; Werner Kraus, Dortmund; Bernd Mayer, Münster, all of Germany

[73] Assignee: BASF Lacke + Farben, AG, Muenster-Hiltrup, Germany

[21] Appl. No.: 596,337

[22] PCT Filed: Aug. 10, 1994

[86] PCT No.: PCT/EP94/02651

§ 371 Date: Mar. 6, 1996

§ 102(e) Date: Mar. 6, 1996

[87] PCT Pub. No.: WO95/07148

PCT Pub. Date: Mar. 16, 1995

[30] Foreign Application Priority Data

Sep. 4, 1993 [DE] Germany ............ 43 29 897.4

[51] Int. Cl.$^6$ .............. B05D 1/02; B05D 1/36; B05D 7/16

[52] U.S. Cl. .............. 427/140; 427/142; 427/421; 427/407.1

[58] Field of Search .............. 427/140, 142, 427/421, 425, 407.1, 409, 299

[56] References Cited

U.S. PATENT DOCUMENTS

| | | | |
|---|---|---|---|
| 3,930,069 | 12/1975 | Stephens | 427/142 |
| 4,089,994 | 5/1978 | Mattsson et al. | 427/140 |
| 4,201,799 | 5/1980 | Stephens | 427/142 |
| 4,265,936 | 5/1981 | Prohaska, Jr. | 427/142 |
| 4,313,970 | 2/1982 | Jones et al. | 427/236 |
| 4,413,036 | 11/1983 | Drexler et al. | 427/385.5 |
| 4,420,520 | 12/1983 | Jones et al. | 427/282 |
| 5,057,342 | 10/1991 | Hoy et al. | 427/422 |
| 5,102,692 | 4/1992 | Tanigami et al. | 427/142 |
| 5,128,176 | 7/1992 | Schmidt | 427/142 |
| 5,294,459 | 3/1994 | Hogan et al. | 427/421 |
| 5,332,159 | 7/1994 | Grime et al. | 239/412 |

FOREIGN PATENT DOCUMENTS

WO 91/14513  3/1991  European Pat. Off..

*Primary Examiner*—Diana Dudash

[57] ABSTRACT

The invention relates to a process for producing a multicoat refinish, in which a metallic basecoat is sprayed on the prepared damage site and the adjacent regions of the old finish, so that it is opaque (hiding) in the region of the damage site and gradually runs out in the region of the old finish. Finally, a clearcoat is applied to the basecoat and, if desired, to the adjacent regions of the old finish.

The process is characterized in that 1. during the application of the basecoat composition to the adjacent regions of the old finish, the spraygun is inclined diagonally to the damage site, and
2. during the application of the basecoat composition, a normal or only slightly reduced (3.0–4.5 bar) spraygun pressure is used.

10 Claims, No Drawings

PROCESS FOR THE PRODUCTION OF A MULTICOAT REFINISH

The present invention relates to a process for the production of a multicoat refinish, in which 1) the damage site is prepared for the application of a refinish, by cleaning, sanding and, if desired, application of a knifing filler and/or filler material, and the adjacent areas, bearing the old finish, are prepared for the application of a refinish, by an appropriate pretreatment,
2) a basecoat composition containing metallic pigments and/or special-effect pigments is applied by spraying to the prepared damage site and to the adjacent areas bearing the old finish, with a coat thickness such that the basecoat is opaque in the region of the damage site and gradually runs out in the adjacent region of the old finish,
3) a polymer film is formed from the basecoat composition applied in step (2),
4) an appropriate, transparent topcoat composition is applied to the resulting basecoat and, if desired, to the adjacent area not coated with a basecoat but bearing the old finish, and subsequently
5) the topcoat is dried together with the basecoat at temperatures between ambient temperature and 140° C., preferably at temperatures below 100° C., particularly preferably at temperatures below 80° C.

The repair of damage sites in a finish is commonly carried out by thorough cleaning of the damage site, sanding, optional knife-filling and application of a repair filler to the damage site. The damage site is then coated. Frequently, however, color differences are to be expected in a panel repair of this type. The repair of metallic finishes is a particular problem, since the color and the brightness of the effect depend heavily on the manner of processing. Decisive factors in this context include the nozzle width of the spraygun and the spray pressure. The nature of dilution and the spray viscosity also have an influence on color and effect.

If color differences are to be expected in such a panel repair and there is no delimitation of the area by trim strips or edges, it may be advantageous and economic to compensate the color differences by so-called blending into the adjacent section, the spray coat gradually running out.

In the case of blending in, the respray coat is opaque in the damage site and gradually runs out in the adjacent areas, i.e. the coating thickness gradually decreasing to 0 μm from the edge of the damage site outwards, using special-effect finishes such as metallic basecoats. After this, the whole area is then covered with a clearcoat until delimitations are reached. In this context, the damage site is usually recoated opaquely at a reduced spraygun pressure of about 2 bar and the blend-coating area is coated over thinly, gradually running out, at a reduced pistol pressure of about 1 bar ("misting out"). Low-solids, conventional special-effect finishes are normally employed for this repair to the damage site. After initial drying of the basecoat produced in this way, the repair site and the adjacent sections are resprayed totally with a clearcoat and, after any flash-off time which may be necessary, are dried together with the previously applied layers at temperatures of, preferably, between ambient temperature and 100° C.

Furthermore, it is common in such a panel repair, if color differences are to be expected and there is no delimitation of the area by trim strips or edges, to follow the conventional preparatory work by prespraying with a heavily diluted clearcoat. The damage site is then resprayed opaquely at reduced spraygun pressure (about 2 bar) with the basecoat composition, and then the blend-coating area is recoated thinly, gradually running out, at about 1 bar spraygun pressure ("misting out"). This process is also followed, after initial drying of the basecoat produced in this way, by a total respray of the repair site and the adjacent sections with a clearcoat and, after any flash-off time which may be necessary, by drying together with the previously applied coats at temperatures of, preferably, between ambient temperatures and 100° C.

In the abovementioned processes which are usual for the production of a refinish, the spraygun is normally held at right angles to the substrate surface for the application of the individual coats of paint. For misting out, the gun is often rotated out of this right-angled position to the mist region, in order to achieve a finer transition. In the course of the blending-in of critical colors (e.g. VW mint-met. VWL-B6/00U, VW bambus-met. VWL-Y1/00Z), clearly visible spray-mist margins are often observed despite these known processes, which margins are evident as marginal zones which, depending on the spray pressure, are lighter or darker and are generally less colored (gray).

Problems occur, moreover, in the application of water-based finishes. Marginal-zone marking or clouding is very often observed in this case. Consequently, it is known from DE-A-40 09 000 to apply initially an aqueous clearcoat, prior to the application of the water-based finish, to the damage site and the adjacent regions of the old finish, and only then to spray on the aqueous basecoat such that it gradually runs out. In the case of some colors (for example the metallic colors mentioned above), however, even this process gives rise to the abovementioned marking of the spray-mist margins.

The object of the present invention was therefore to provide a process for the production of a refinish, with which repairs could be carried out to the damage sites on a multicoat metallic or special-effect finish, even with critical colors, such that the site of repair is virtually or completely invisible, i.e. such that color changes, clouding and marginal-zone marking should each be avoided in the transitional region between repair filler and old finish and in the transitional region between basecoat and clearcoat. In this context, this process should be applicable both to conventional and to aqueous coating compositions.

This object is surprisingly achieved by a process of the type mentioned at the beginning which is characterized in that 1. during the application of the basecoat composition to the adjacent regions of the old finish, the spraygun is inclined diagonally to the damage site, and
2. during the application of the basecoat composition, a normal or only slightly reduced spraygun input pressure is used.

Surprisingly, the process according to the invention can be used to repair damage sites on a multicoat metallic finish in such a way that the site of repair is almost or completely invisible. In particular, the effects in the marginal zones, which are observed frequently in the case of conventional repair methods, are avoided. The spray-mist margins which are often clearly visible in the blending-in of critical colors (e.g. VW mint-met. VWL-B-6/00U, VW bambus-met. VWL-Y1/00Z) and which, depending on the spray pressure, are evident as lighter or darker, generally less colored (gray) marginal zones, are avoided in particular. In this respect, it is of importance that these outstanding results can be achieved using both conventional metallic refinish basecoats and aqueous metallic refinish basecoats.

The process according to the invention for the production of a multicoat refinish can be applied to a very wide variety of substrates. It is of no consequence to the process whether the damage sites have conventional or water-thinnable systems.

For carrying out the process according to the invention, the damage site is first prepared as usual by thorough cleaning, sanding, optional knife-filling and fillers. The preparatory operations required in each case depend on the nature of the damage to be repaired and on the quality required of the refinish. Such operations are known (cf. e.g. Glasurit-Handbuch, Farben+Lacke, 11th Edition, Kurt R. Vincentz Verlag, Hanover 1984, chapter 4, section 7: "Pkw-Reparaturlackierung" [Automotive refinishing], page 523 ff.) and therefore require no further discussion here. Both conventional and water-dilutable primer materials, as are commonly employed, are suitable for these preparatory operations. For economic reasons, and to improve workplace safety (fire protection), and—in particular—to reduce environmental pollution, use is increasingly being made of water-dilutable primer materials.

The regions of the old finish to be recoated are likewise prepared appropriately to receive a refinish. Conventionally, these regions of the old finish, which are to be recoated with a refinish, are thoroughly cleaned, for example using a silicone stripper, and roughened with abrasive paste or sandpaper. After this, the area pretreated in this way is usually cleaned again and degreased. In addition to this, however, it is also possible to precoat these regions of the old finish using, for example, an adhesion promoter solution. This preparation of the regions of the old finish to be coated, however, is likewise known and therefore requires no further discussion.

If desired, an aqueous or water-dilutable or else conventional coating composition can subsequently be applied to the appropriately prepared damage site and, furthermore, to the adjacent areas of the old finish. In this case, this coating composition is applied in the region of the damage site at a dry film thickness of 2–50 µm, preferably 5–20 µm. In the adjacent areas of the old finish, on the other hand, the dry film thickness of this coating composition gradually decreases, from the edge of the damage site outwards, down to 0 µm. This type of coating with a decreasing coating thickness is commonly described as running out gradually. This term is also used below, for purposes of simplification, for the application of coating compositions with a coating thickness decreasing gradually to 0 µm. The region of the adjacent, old finish, which is coated—running out gradually—with this coating composition, depends on a number of factors such as, for example, the spraygun employed, the spray pressure, the nature, size and position of the damage site and the like. The application of the coating composition, gradually running out, is conventionally effected in a region of the old finish around the damage site which is between 1 cm and 1 m wide. However, the optimum region of the old finish to be coated in each case can readily be determined by the person skilled in the art on the basis of a few routine tests.

In addition to this variant of spraying the coating composition, with the coat gradually running out, it is also possible to apply this coating composition to the damage site and to all of the adjacent region of the old finish until a delimitation is reached, for example an edge or strip, using a dry film thickness of 2–50 µm, preferably 5–20 µm.

In the case of metallic basecoats in particular, this leads to an improved color match with the old finish. Normally, heavily diluted clearcoats are applied for this operation, which may be either aqueous, water-dilutable or else conventional.

If conventional clearcoats are applied, then preliminary drying must be carried out before the basecoat is applied. This is usually performed by heating the clearcoat to a temperature below 140° C., preferably below 80° C., for a period of 5–60 min.

If aqueous coating compositions are employed for this step of the process, then a baking step may optionally be omitted and, after a brief flash-off time of from 5 to 50 min, the basecoat composition can be applied directly.

If this damage site and the adjacent regions of the old finish are presprayed using such a clearcoat, then it may optionally be possible to omit the sanding of the old finish. Conventionally, however, the above-described pretreatment of the old finish is carried out by cleaning and sanding.

Examples of aqueous clearcoats which are suitable for this pretreatment of the damage site and the old finish are described in DE-A-40 09 000. In addition to this, however, the conventional clearcoats commonly employed for this purpose, as marketed by, for example, Glasurit GmbH, can be employed.

It is essential to the invention that a basecoat composition containing metallic and/or special-effect pigments is then applied, using a specific application technique, to the appropriately prepared damage site and, furthermore, to the adjacent areas which bear the old finish.

Conventionally, this basecoat composition is applied by spraying such that the damage site is misted out opaquely at a reduced spraygun pressure (about 2 bar) and the blend-coating area is misted out thinly, gradually running out, at a reduced spraygun pressure (about 1 bar). The position of the spraygun during this procedure is normally at right angles to the substrate surface.

For misting out, the gun is often rotated out of this right-angled position towards the misting region (region of the adjacent old finish) in order to achieve a finer transition. However, these conventional methods lead—especially during the blending-in of critical colors—in many cases to visible spray-mist margins, which are evident depending on the spray pressure as lighter or darker, generally less colored (gray) marginal zones. These visible spray-mist margins are avoided by the process according to the invention.

In the process according to the invention, in the case of the first variant, the areas adjacent to the damage site, bearing the old finish, are first masked off, and then a basecoat composition containing metallic and/or special-effect pigment is applied opaquely by spraying in the region of the damage site. In this context, it is preferred to use a normal or only a slightly reduced spraygun pressure. The spraygun input pressure is preferably between 3.0 and 4.5 bar. The spraygun output pressure varies depending on the spraygun used. For example, it is between 0.6 and 0.7 bar if an HVLP (high-volume, low-pressure) gun is used. After this, the masking is removed and the areas adjacent to the damage site, bearing the old finish, are coated by spraying with the basecoat composition containing metallic and/or special-effect pigments, such that the basecoat gradually runs out. In this case, too, it is preferred to use a normal or only slightly reduced spraygun pressure. The spraygun input pressure is, here too, preferably above 2 bar, particularly preferably between 3 and 4.5 bar. In turn, the spraygun output pressure varies depending on the spraygun used. Sprayguns which are suitable for the application of the basecoat composition are all those which are conventionally employed for the application of basecoats, for example the HVLP guns mentioned above, but also normal pneumatic high-performance sprayguns (e.g. SATA JET 1,4 E).

It is essential to the invention, furthermore, that the spraygun is inclined diagonally towards the damage site when the basecoat composition is applied to these adjacent regions of the old finish. It is preferred, during the application of the basecoat composition, for the spraygun to be inclined towards the damage site such that the spraygun forms an angle of between 25° and 65°, particularly preferably between 30° and 60°, with the surface of the old finish. The angle should in each case be chosen such that misting of the spray jet is avoided as far as possible. Consequently, the angle chosen should be smaller the larger the width of the spray jet.

In a very particularly preferred manner, the spraygun is rotated during the application of the basecoat composition such that the spraygun forms an angle of 90°±60° with the surface of the old finish in the region of the damage site, and, particularly preferably, is guided substantially vertical with respect to the surface. In the outer region of the area bearing the old finish, the spraygun then again forms an angle of from 25° to 65°, particularly preferably from 30° to 60°. In this process, therefore, the spraygun is first held vertically in the region of the damage site and then, during the spraying operation, is rotated into a diagonal position if working from the damage site outwards. Correspondingly, the spraygun is first held in a diagonal inclination towards the damage site and, during the spraying operation, is rotated into a right-angled position, if working from the region of the old finish towards the damage site.

By this combination of the two process parameters—firstly, the holding of the spraygun diagonally towards the damage site and, secondly, the application of the basecoat composition at normal or only slightly reduced pressure—spray mists are avoided when building up the basecoat, whereas in prior processes it is precisely the basecoat which is misted during the application of the basecoat. By this process according to the invention it is ensured that visible spray-mist margins are avoided even when blend-coating with critical colors.

The basecoat composition containing metallic and/or special-effect pigments is preferably applied in two or more successive spray passes. In this operation, the basecoat composition is first applied opaquely in the region of the damage site, the adjacent regions being masked off as described above. After removing the masking, the adjacent regions of the old finish are then coated with the basecoat composition, using—as described above—normal or only slightly reduced spraygun pressure and guiding the spraygun in diagonal inclination with respect to the damage site. In this context, the basecoat composition is preferably applied by two or more spray passes in the region of the old finish.

The preferred procedure here is to begin application of the basecoat composition in the outer region of the old finish and to continue application towards the damage site until the damage site itself is reached. In the next spray pass, the application of the basecoat composition is begun at a site in the old finish which is closer to the damage site than the starting point at which application of the basecoat was begun in the previous spray pass. By this spatially offset repetition of the application of the basecoat composition in a second spray pass, it is possible to achieve a gradually running-out color match (the underlayer showing through). If desired, this spray pass can also be repeated several times more, especially if basecoat compositions of only poor opacity are applied. The basecoat composition is preferably applied from 1 to 8, particularly preferably from 2 to 4, spray passes to the areas adjacent to the damage site, bearing the old finish.

Of course, it is also possible in this context to achieve the gradually running-out color match by beginning the first spray pass in the region of the damage site and, starting from here, to spray the region of the old finish such that the coating gradually runs out. In the second and any further, subsequent spray passes, application of the basecoat composition is then begun each time at a greater distance from the damage site. Essential features of the invention continue to be the guidance of the spraygun at an inclination with respect to the damage site and the use of a normal or only slightly reduced spraygun pressure.

Furthermore, it is also possible, for the application of the basecoat composition, not to mask off the areas adjacent to the damage site, bearing the old finish, but to coat the damage site directly and opaquely and to coat the adjacent regions of the old finish such that the coat gradually runs out (variant 2 of the process according to the invention).

This process can again be begun in the region of the damage site or in the region of the old finish adjacent thereto. Again, too, a number of spray passes are possible. The only difference between variants 1 and 2 of the process according to the invention is the masking of the damage site. With regard to further details, therefore, reference is made to the description above of variant 1. In this variant of the process too, therefore, it is essential to the invention that the spraygun be held preferably vertically in the region of the damage site and then, during the application of the basecoat composition in the adjacent regions of the old finish, that it be rotated such that it is inclined towards the damage site. Furthermore, normal or only slightly reduced spraygun pressure is again used, as has already been described above.

Basecoat compositions which contain metallic and/or special-effect pigments and are suitable for this process (variants 1 and 2) are all those conventionally employed for refinishing. For example, the aqueous basecoat compositions described in DE-A-40 09 000 are also suitable. The basecoat compositions prepared using a mixer system, which may be either conventional or aqueous, are also suitable.

Examples of suitable, conventional and aqueous basecoat compositions are those prepared by using a mixer system described in DE-A-41 10 520, in German Patent Application P 42 32 721.0, which is not a prior publication, and German Patent Application P 42 32 717.2, which is not a prior publication.

For the application of these basecoat compositions containing metallic and/or special-effect pigments, the sprayguns conventionally employed for topcoats are suitable. Sprayguns having a nozzle width of 1.0–1.6 mm are preferably employed. For the application of the basecoat compositions, the spraygun input pressure is preferably between 3.0 and 4.5 bar. The spraygun output pressure varies with the respective spraygun used.

As already stated, the basecoat composition is applied in the region of the areas bearing the old finish such that the coat gradually runs out. This means that the dry film thickness of the basecoat decreases down to 0 μm.

In this context, the dry film thickness of the basecoat preferably decreases to 0 μm in a region of the old finish which is between 1 cm and 1 m wide. However, depending on the size and position of the damage site, this region of the old finish which is coated with the basecoat gradually running out may also be considerably larger. For example, it may be entirely appropriate to apply the basecoat composition so that it gradually runs out until a delimitation is reached or even into the adjacent section. However, this is familiar to the person skilled in the art and requires no further discussion here.

After formation of a polymer film from the basecoat composition, preferably after drying of the basecoat at temperatures from ambient temperature to 140° C., preferably at temperatures below 80° C., for a period of from 5 to 60 min, and if appropriate after a brief cooling period which is in general at least 5 min, a suitable transparent topcoat composition is applied to the basecoat. If a clearcoat has also been applied prior to the application of the basecoat composition, and if not all of the clearcoat region was provided with a basecoat, the suitable transparent topcoat composition is also applied to those sections of the clearcoat which were not coated with the basecoat. The topcoat composition is preferably applied so that it gradually runs out into the uncoated region of the old finish or so that it is opaque over the entire adjacent old finish until reaching an edge, trim strip or the like, since in this way time-consuming polishing work can be dispensed with. The dry film thickness of the topcoat is in general between 30 and 100 µm.

Suitable topcoat compositions include both organically dissolved and aqueous 1- or 2-component clearcoats. Clearcoats which are frequently employed are those based on an acrylate copolymer containing hydroxyl groups and on a polyisocyanate. Examples of such clearcoats are described in the patent applications DE-A-34 12 534, DE-A-36 09 519, DE-A-37 31 652 and DE-A-38 23 005. Also suitable are the moisture-curing clearcoats which are described in the international patent application having the international publication number WO 88/02010 and are based on polyaddition polymers containing alkoxy- or aryloxy-silane units.

After any flash-off time which may be necessary, of about 5 min, the topcoat is then dried, together if appropriate with the basecoat and together if appropriate with the previously applied clearcoat, at temperatures between ambient temperature and 140° C., preferably at temperatures below 80° C., for a period of from 5 to 120 min.

The invention is now illustrated in more detail in the Examples which follow. All parts and percentages in these Examples are by weight, unless expressly stated otherwise. The substrate used is a multicoat, simulated old finish as is conventional in production-line automotive finishing. In this context it is of no consequence whether the coating materials are based on conventional or on water-thinnable systems.

Simulation of a Damage Site

The substrate used is an electrodeposition-primed steel panel provided with a commercially available, conventional filler material based on a melamine-crosslinked polyester resin (FC 60-7133 from BASF Lacke+Farben AG, Münster; dry film thickness 40 µm), a commercially available, conventional metallic basecoat based on cellulose acetobutyrate (AE 54-9153 from BASF Lacke+Farben AG, Münster; dry film thickness 15 µm) and a commercially available, conventional clearcoat based on isocyanate-crosslinked acrylates which contain hydroxyl groups (AF 23-0185 from BASF Lacke+Farben AG, Münster; dry film thickness 60 µm). After conventional drying (60° C., 30 min) the coated panel is additionally stored for a number of hours at elevated temperature, for example 60° C., and in this way the coating is aged.

A repair site is simulated on this substrate by preparing an area sanded through down to the sheet metal (diameter approximately 5 cm). This sanded-through area is produced such that the transitions from the metal to the clearcoat are as flat as possible.

A commercially available, conventional primer surfacer for refinishing, based on isocyanate-crosslinked acrylates containing hydroxyl groups (AB 85-1122 from BASF Lacke+Farben AG, Münster; dry film thickness 70 µm), is applied to the damage site produced in this way and is dried by heating at 60° C. for a period of 30 min. The damage site and the sections of the old finish adjacent to the damage site, which are also to be coated in the course of the blending-in operation (a 1 cm wide strip around the damage site), are roughened with sandpaper so as to produce smooth transitions to the old finish.

EXAMPLE 1

In the case of the damage site described above, the adjacent regions of the old finish are masked off (for example using water-resistant masking paper). Then the commercially available refinish basecoat composition VW mint-met. VWL-B6/00U from BASF Lacke+Farben AG, Münster is applied opaquely in the region of the damage site (dry film thickness 15 µm). This application is carried out using the HVLP spraygun (high-volume, low-pressure spraygun) SATA Jet B NR92 (nozzle width 1.3 mm) at a spraygun input pressure of 4.5 bar (spraygun output pressure 0.7 bar). The masking is then removed and the blend-coating area is coated from the outside towards the damage site with the basecoat composition. The above-described HVLP spraygun SATA Jet B NR92 is also employed for this. In this case, the spraygun input pressure is again 4.5 bar and the spraygun output pressure 0.7 bar. During the application of the basecoat composition in the region of the old finish, the spraygun is first held at an angle of about 45° to the substrate, towards the damage site, and then is rotated into a right-angled position during the spraying operation. In this spraying operation, the application of the basecoat composition is begun in the outer region of the old finish, working towards the damage site. After the damage site has been coated over, in order to coat the old finish on the other side of the damage site, the spraygun is correspondingly rotated out of the right-angled position back into a diagonal position (45° angle to the substrate, towards the damage site). By repetition of the procedure—spatially offset if desired—in a second spray pass it is possible to achieve a color match such that the coat gradually runs out (the underlayer shows through). The second spray pass preferably begins at a site of the old finish which is closer to the damage site than the point at which the first spray pass is begun. If desired, this second spray pass can also be repeated several times. It is also possible for the first spray pass to begin closer to the damage site, with the second spray pass then being begun at a greater distance from the damage site.

After a brief flash-off time of 60 min, the clearcoat is sprayed over the entire repair area and over the region of the basecoat composition applied, gradually running out into the region of the uncoated old finish. The product employed is the commercially available 2-component clearcoat based on isocyanate-crosslinked acrylates which contain hydroxyl groups (AF 23-0185+SC 29-0173+SV 41-0391 from BASF Lacke+Farben AG, Münster; mixing ratio 2:1:0.6). By applying the clearcoat over the region of the basecoat into the adjacent sections, the resulting coating has a uniform surface structure, so that a laborious polishing operation on the damage site is no longer necessary. In this context, the clearcoat is applied in the region of the damage site at a dry film thickness of 60 µm. After a brief flash-off time of 5 min, the topcoat is finally dried at 60° C. for 30 min.

In contrast to the previous process, matching is achieved not by misting at reduced pressure but by avoiding spray mist while building up the basecoat.

EXAMPLE 2

The damage site described above is coated, from the outside towards the damage site, at normal spraygun input pressure (4.5 bar) and a spraygun output pressure of 0.7 bar, using the above-described spraygun SATA Jet B NR92 and the commercially available refinish basecoat composition described in Example 1: VW mint-met VWL-B6/00U.

The damage site itself is coated using this spraygun with an opaque coating of the basecoat composition at normal spraygun input pressure (4.5 bar). In this case, too, the spraygun is first held inclined towards the damage site at an angle of about 45° to the substrate and then, during the spraying operation, is rotated into a right-angled position which is reached in the region of the damage site. By repetition of the procedure—spatially offset if desired—in a second and, if desired, a third or fourth spray pass, it is possible to achieve a color match such that the coat gradually runs out.

In this case too it is possible for the first spray pass to be closer to the damage site than the second and any subsequent spray passes. After a brief flash-off time of 60 min, the clearcoat is sprayed over the entire repair area and over the region of the basecoat composition applied such that it gradually runs out into the region of the uncoated old finish. The product employed is the commercially available 2-component clearcoat based on isocyanate-crosslinked acrylates which contain hydroxyl groups (AF 23-0185+SC 29-0173+SV 41-0391 from BASF Lacke+Farben AG, Münster; mixing ratio 2:1:0.6). By applying the clearcoat over the region of the basecoat into the adjacent sections, [lacuna] has a uniform surface structure, so that a laborious polishing operation on the damage site is no longer necessary. In this context, the clearcoat is applied in the region of the damage site at a dry film thickness of 60 μm. After a brief flash-off time of 5 min, the topcoat is finally dried at 60° C. for 30 min.

This Example 2 differs, therefore, from Example 1 only in that the damage site is effected [sic] simultaneously with the coating of the areas bearing the old finish, and not in a separate operation. In this process, too, no spray-mist margins are observed with critical colors.

EXAMPLES 3 AND 4

Examples 1 and 2 are repeated with the sole difference that the basecoat composition employed is now the commercially available basecoat composition VW bambus-met. VWL-Y1/00Z.

Comparison Example

The procedure is analogous to Examples 1–4, the sole difference being that the basecoat composition is applied in the region of the damage site at a reduced pressure (spraygun input pressure about 2 bar and spraygun output pressure 0.4 bar) and the blend-coating area [lacuna] at a reduced spraygun input pressure of 1 bar and a spraygun output pressure of <0.4 bar. Moreover, the position of the spraygun is at right angles in the region of the damage site and in the vicinity of the damage site and, for misting out, the gun is rotated out of this right-angled position towards the misting region (region of the old finish) in order to achieve a finer transition. In the case of both the refinish basecoat VW mint-met. VWL-B6/00U and the refinish basecoat VW bambus-met. VWL-Y1/00Z, clearly visible spray-mist margins are observed, which are evident as darker, less colored (gray) marginal zones.

We claim:

1. A process for the production of a multicoat refinish of a damage site, comprising the steps of:
   1.) preparing the damage site by cleaning, sanding, and, optionally, applying a filler, and preparing areas bearing the old finish that are adjacent to the damage site by a pretreatment,
   2.) applying a basecoat composition containing metallic pigments and/or special-effect pigments to the prepared damage site and adjacent areas bearing the old finish by spraying from a spraygun inclined towards the damage site to form an angle of between about 25 and 65 degrees with the surface of the prepared adjacent areas bearing the old finish, such that the basecoat is opaque in the region of the damage site and gradually runs out in the prepared adjacent areas bearing the old finish, using a spraygun inlet pressure of from 3.0 to 4.5 bar,
   3.) forming a polymer film from the applied basecoat composition,
   4.) applying a transparent topcoat composition to the resulting basecoat and, optionally, to adjacent areas bearing the old finish not coated with a basecoat, and subsequently
   5.) drying the topcoat together with the basecoat at temperatures between ambient temperature and 140° C.

2. A process according to claim 1 wherein, during the application of the basecoat composition, the spraygun is rotated from an angle of 90° with respect to the damage site to an angle of from 25° to 65° with respect to said prepared areas bearing the old finish, and further wherein misting of the spray jet is avoided.

3. A process according to claim 1 further comprising the step of masking off the prepared areas adjacent to the damage site bearing the old finish, applying said basecoat composition to opacity by spraying, and then removing the masking and spraying the prepared areas bearing the old finish adjacent to the damage site with the basecoat composition.

4. A process according to claim 1, wherein the prepared areas adjacent to the damage site bearing the old finish are coated with the basecoat composition in multiple successive spray passes by
   a) applying the basecoat composition from the outer edge of the prepared areas bearing the old finish inward to the damage site,
   b) in the next spray pass, applying the basecoat composition inward to the damage site from a part of the prepared areas bearing the old finish which is closer to the damage site than the starting point at which application was begun in the previous spray pass and, optionally,
   c) repeating process step b) one or more times.

5. Process according to claim 1, wherein the basecoat composition is applied in from 1 to 8 spray passes to the areas adjacent to the damage site, bearing the old finish.

6. A process according to claim 1, wherein the applied basecoat decreases to a dry film thickness of 0 μm in the prepared areas bearing the old finish which is between 1 cm and 1 m wide from the edge of the damage site outwards.

7. A process according to claim 1, wherein the transparent topcoat composition is applied over the prepared areas bearing an old finish which have been coated with the basecoat composition, until a trim strip or edge is reached.

8. A process according to claim 1, wherein the transparent topcoat composition is applied such that it gradually runs out.

9. Process according to claim 1 to further comprising applying to the prepared damage site and to the adjacent areas which bear the old finish, a coating composition which is free of metallic and special-effect pigment, prior to the application of the basecoat composition.

10. Process according to claim 1 wherein during the application of the basecoat composition, a spraygun with a nozzle width of 1.0 to 1.6 mm is used.

* * * * *